US010128484B2

(12) United States Patent
Kim

(10) Patent No.: US 10,128,484 B2
(45) Date of Patent: Nov. 13, 2018

(54) RECHARGEABLE BATTERY

(71) Applicant: SAMSUNG SDI CO., LTD., Yongin-si, Gyeonggi-do (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 143 days.

(21) Appl. No.: 14/091,257

(22) Filed: Nov. 26, 2013

(65) Prior Publication Data

US 2014/0377601 A1 Dec. 25, 2014

(30) Foreign Application Priority Data

Jun. 19, 2013 (KR) .................. 10-2013-0070438

(51) Int. Cl.
```
H01M 2/34      (2006.01)
H01M 2/22      (2006.01)
H01M 2/02      (2006.01)
H01M 2/30      (2006.01)
```
(52) U.S. Cl.
CPC ............ *H01M 2/34* (2013.01); *H01M 2/22* (2013.01); *H01M 2/345* (2013.01); *H01M 2/348* (2013.01); *H01M 2/0217* (2013.01); *H01M 2/30* (2013.01); *H01M 2200/103* (2013.01); *H01M 2200/20* (2013.01)

(58) Field of Classification Search
CPC .......... H01M 2/30; H01M 2/34; H01M 2/349; H01M 2/22; H01M 2/345; H01M 2/348; H01M 2/0217

USPC ........................................ 429/61, 178-180
See application file for complete search history.

(56) References Cited

U.S. PATENT DOCUMENTS

| 9,741,997 | B2 | 8/2017 | Lee et al. |
| 2009/0320277 | A1 | 12/2009 | Barrella et al. |
| 2011/0086258 | A1 | 4/2011 | Yaginuma et al. |

(Continued)

FOREIGN PATENT DOCUMENTS

| CN | 102867933 A | 1/2013 |
| EP | 0 570 590 A1 | 11/1993 |

(Continued)

OTHER PUBLICATIONS

EPO Search Report dated Nov. 4, 2014, for corresponding European Patent application 14150160.1, (5 pages).

(Continued)

*Primary Examiner* — Jimmy Vo
(74) *Attorney, Agent, or Firm* — Lewis Roca Rothgerber Christie LLP

(57) ABSTRACT

A rechargeable battery including: an electrode assembly including a first electrode plate, a second electrode plate, and a separator between the first electrode plate and the second electrode plate; a case accommodating the electrode assembly; a first electrode terminal and a second electrode terminal electrically connected to the first electrode plate and the second electrode plate, respectively, and protruding to the outside of the case; and a first terminal plate and a second terminal plate positioned outside the case and coupled to the first electrode terminal and the second electrode terminal, respectively, and a terminal plate of the first terminal plate and the second terminal plate includes a first fuse.

15 Claims, 7 Drawing Sheets

(56) References Cited

U.S. PATENT DOCUMENTS

| | | | |
|---|---|---|---|
| 2011/0177365 A1 | 7/2011 | Yasui et al. | |
| 2011/0177387 A1 | 7/2011 | Byun et al. | |
| 2011/0183165 A1* | 7/2011 | Byun | H01M 2/0202 429/61 |
| 2011/0300419 A1 | 12/2011 | Byun | |
| 2011/0305928 A1 | 12/2011 | Kim et al. | |
| 2012/0103930 A1 | 5/2012 | Zhou et al. | |
| 2012/0214030 A1* | 8/2012 | Guen | H01M 2/0404 429/61 |
| 2012/0225333 A1 | 9/2012 | Kim | |
| 2012/0263976 A1 | 10/2012 | Byun et al. | |
| 2013/0029191 A1* | 1/2013 | Byun | H01M 2/024 429/61 |
| 2013/0089760 A1 | 4/2013 | Km et al. | |
| 2013/0101870 A1 | 4/2013 | Byun et al. | |
| 2013/0193763 A1 | 8/2013 | Zhao et al. | |
| 2013/0196179 A1* | 8/2013 | Han | H01M 2/04 429/7 |
| 2013/0295445 A1 | 11/2013 | Byun | |
| 2014/0159921 A1 | 6/2014 | Qualey et al. | |
| 2014/0170449 A1 | 6/2014 | Takahashi et al. | |
| 2014/0315055 A1 | 10/2014 | Byun et al. | |
| 2014/0377601 A1 | 12/2014 | Kim | |
| 2015/0093612 A1 | 4/2015 | Okuno | |

FOREIGN PATENT DOCUMENTS

| | | |
|---|---|---|
| EP | 2 495 785 A1 | 9/2012 |
| EP | 2 515 363 A1 | 10/2012 |
| EP | 2 544 264 A1 | 1/2013 |
| EP | 2 579 357 A1 | 4/2013 |
| EP | 2 624 327 A1 | 8/2013 |
| EP | 2793295 A2 | 10/2014 |
| JP | 2013-20965 A | 1/2013 |
| KR | 10-1036070 B1 | 5/2011 |
| KR | 10-2011-0133255 A | 12/2011 |
| KR | 10-2012-0052189 A | 5/2012 |
| KR | 10-2012-0099919 | 9/2012 |
| KR | 10-2013-0036989 A | 4/2013 |
| KR | 10-1254871 B1 | 4/2013 |
| KR | 2013-0044965 A | 5/2013 |
| KR | 10-2014-0147351 A | 12/2014 |
| WO | WO 2012/164884 A1 | 12/2012 |

OTHER PUBLICATIONS

Korean Office action dated Jun. 13, 2016 for corresponding Korean Application No. KR 10-2013-0070438 A1 (12 pgs.).
KIPO Notice of Allowance dated Dec. 20, 2016, for corresponding Korean Patent Application No. 10-2013-0070438 (5 pages).
EPO Search Report dated Nov. 13, 2015, corresponding to European Patent Application 15185578.0 (8 pages).
U.S. Office Action dated Nov. 3, 2016, issued in U.S. Appl. No. 14/819,308 (8 pages).
U.S. Office Action dated Oct. 4, 2017, issued in U.S. Appl. No. 14/660,416 (19 pages).
JPO Office Action dated Nov. 27, 2017, for corresponding Japanese Patent Application No. 2014-012118 (7 pages).
SIPO Office Action dated Jul. 17, 2017, for corresponding Chinese Patent Application No. 201410105634.3 (7 pages).
EPO Office Action dated Nov. 14, 2017, for corresponding European Patent Application No. 14150160.1 (5 pages).
U.S. Final Office Action dated Apr. 10, 2018, issued in U.S. Appl. No. 14/660,416 (14 pages).

* cited by examiner

RECHARGEABLE BATTERY

CROSS-REFERENCE TO RELATED APPLICATION

This application claims priority to and the benefit of Korean Patent Application No. 10-2013-0070438, filed on Jun. 19, 2013 in the Korean Intellectual Property Office, the entire content of which is incorporated herein by reference.

BACKGROUND

1. Field

Aspects of embodiments of the present invention relate to a rechargeable battery.

2. Description of the Related Art

Secondary batteries are rechargeable, unlike primary batteries which are not. Types of rechargeable secondary batteries include a low-capacity battery including a battery cell in the form of a pack and typically used for small portable electronic devices, such as cellular phones and camcorders, and a high-capacity battery including dozens of battery cells connected to one another and typically used as a motor-driving power source, such as for electric scooters, hybrid vehicles, or electric vehicles.

Rechargeable batteries are manufactured in various shapes such as a cylindrical shape and a prismatic shape. A rechargeable battery is constructed as follows: an electrode assembly formed by inserting an insulating separator between positive and negative electrode plates is placed in a case together with electrolyte; and a cap plate is located on the case. The electrode assembly is connected to the cap plate having electrode terminals.

If excessive heat is generated in a rechargeable battery or an electrolyte is decomposed, a pressure surge, fire, or explosion may be caused in the rechargeable battery. Thus, it is desirable to make rechargeable batteries having improved safety.

SUMMARY

According to an aspect of embodiments of the present invention, a rechargeable battery has improved safety by preventing or substantially preventing abnormal breakdown in a cell due to a short circuit by providing fuses inside and outside the cell.

According to one or more embodiments of the present invention, a rechargeable battery includes: an electrode assembly including a first electrode plate, a second electrode plate, and a separator between the first electrode plate and the second electrode plate; a case accommodating the electrode assembly; a first electrode terminal and a second electrode terminal electrically connected to the first electrode plate and the second electrode plate, respectively, and protruding outside the case; and a first terminal plate and a second terminal plate positioned outside the case and coupled to the first electrode terminal and the second electrode terminal, respectively, and a terminal plate of the first terminal plate and the second terminal plate includes a first fuse part.

The first terminal plate may include a first terminal body part coupled to the first electrode terminal, and the first fuse part at a region of the first terminal body part.

The first fuse part may have a greater electrical resistance than the first terminal body part.

The first fuse part may have a smaller thickness than the first terminal body part.

The first fuse part may be made of a different material from the first terminal and have a greater electrical resistance than the first terminal body part.

The first fuse part may include a clad metal.

The rechargeable battery may further include a first collector plate and a second collector plate at opposite sides of the electrode assembly, and electrically connecting the first electrode plate and the second electrode plate to the first electrode terminal and the second electrode terminal, respectively, and the first collector plate may include a second fuse part.

The first collector plate may include a coupling part coupled to the first electrode terminal, and an extension part extending from the coupling part and coupled to the first electrode plate.

The second fuse part may be formed in the coupling part and spaced apart from the first electrode terminal.

The first fuse part may have a greater electrical resistance than the second fuse part.

The rechargeable battery may further include a cap assembly sealing the case and including a cap plate having a short-circuit hole covered by the second terminal plate, and the cap assembly may include an inversion plate in the short-circuit hole.

The inversion plate may include a convex round part, and a flange part fixed to the cap plate.

The inversion plate may be inverted and contact the second terminal plate when an internal pressure of the rechargeable battery exceeds a reference pressure.

The inversion plate may be electrically connected to the first electrode plate.

The second terminal plate may include a second terminal body part coupled to the second electrode terminal, and the first fuse part at a region of the second terminal body part.

According to at least one of embodiments, there is provided a rechargeable battery including: an electrode assembly including a first electrode plate, a second electrode plate, and a separator between the first electrode plate and the second electrode plate; a case accommodating the electrode assembly; and a first electrode terminal and a second electrode terminal electrically connected to the first electrode plate and the second electrode plate, respectively, and protruding outside the case, and the first electrode terminal includes a first fuse.

The first electrode terminal may include an electrode body part protruding outside the case, and the first fuse part extending from an end of the terminal body part toward an inside of the case.

The first fuse part may have a greater electrical resistance than the terminal body part.

The first fuse part may have a smaller thickness than the terminal body part.

The rechargeable battery may further include a first collector plate and a second collector plate at opposite sides of the electrode assembly, and electrically connecting the first electrode plate and the second electrode plate to the first electrode terminal and the second electrode terminal, respectively, and the first collector plate may include a second fuse part.

The first fuse part may have a greater electrical resistance than the second fuse part.

The rechargeable battery may further include a first terminal plate and a second terminal plate positioned outside the case and coupled to the first electrode terminal and the second electrode terminal, respectively, and a cap assembly sealing the case and including a cap plate having a short-circuit hole covered by the second terminal plate, and the cap assembly includes an inversion plate in the short-circuit hole.

The inversion plate may include a convex round part, and a flange part fixed to the cap plate.

The inversion plate may be inverted and contact the second terminal plate when an internal pressure of the rechargeable battery exceeds a reference pressure.

The inversion plate may be electrically connected to the first electrode plate.

As described above, a rechargeable battery according to one or more embodiments of the present invention includes fuses in a collector plate provided inside a cell, and electrode terminals or a terminal plate provided outside the cell, thereby allowing the fuse provided outside the cell to operate first due to a short circuit caused in the rechargeable battery.

Therefore, in the rechargeable battery according to one or more embodiments of the present invention, arcing generated inside the cell due to a short circuit caused in the rechargeable battery may be caused to be generated outside the cell, and abnormal breakdown occurring inside the cell can be prevented or substantially prevented, thereby improving the safety of the rechargeable battery.

BRIEF DESCRIPTION OF THE DRAWINGS

The accompanying drawings are included to provide a further understanding of the present invention, and are incorporated in and constitute a part of the disclosure. The drawings illustrate some exemplary embodiments of the present invention and, together with the description, serve to explain principles of the present invention. In the drawings.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Figure 1:
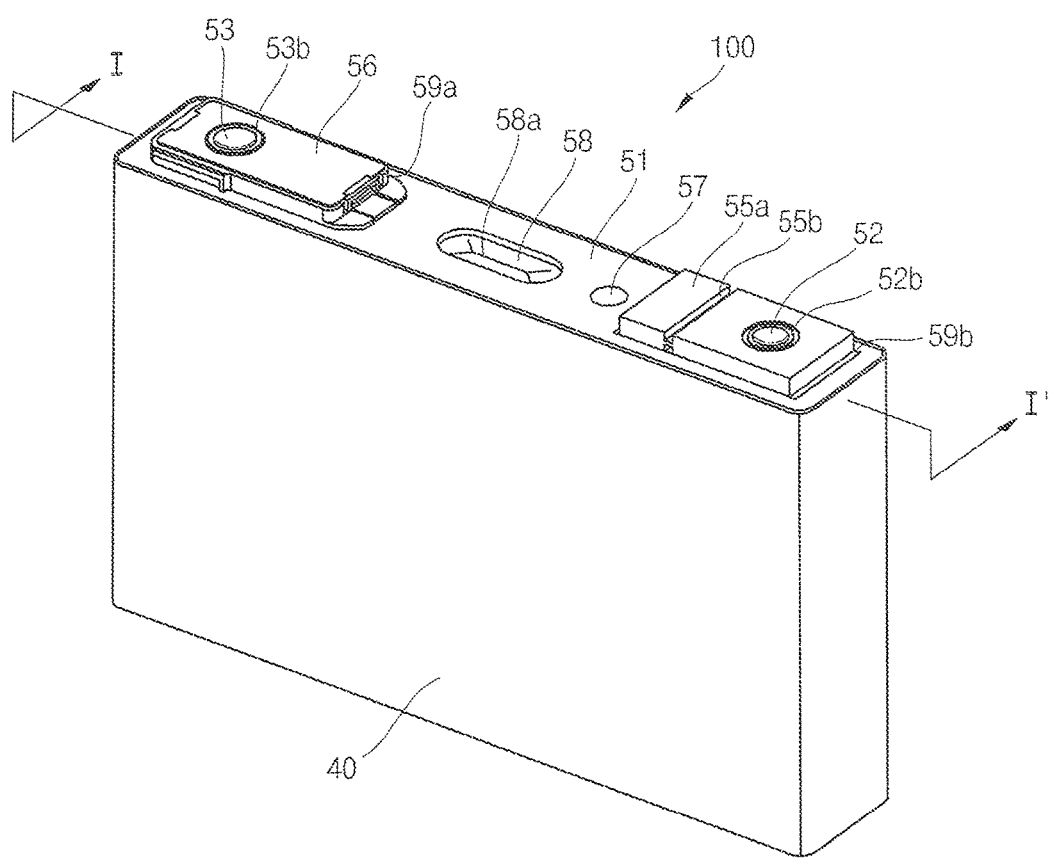
FIG. 1 is a perspective view of a rechargeable battery according to an embodiment of the present invention.
Figure 2:
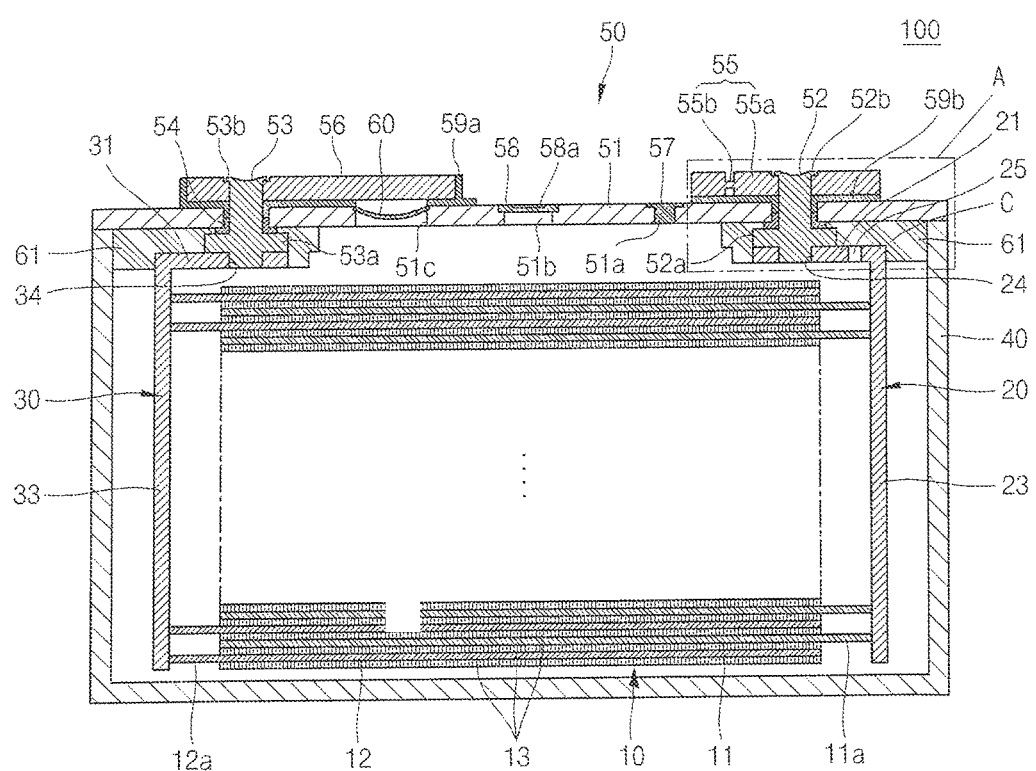
FIG. 2 is a cross-sectional view of the rechargeable battery of FIG. 1, taken along the line I-I'.
Figure 3:
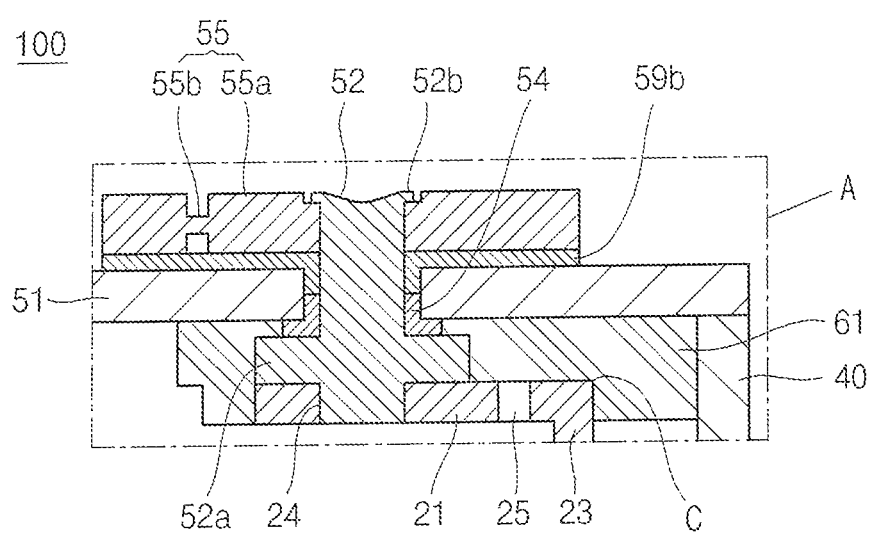
FIG. 3 is an enlarged cross-sectional view illustrating a region "A" of FIG. 2.
Figure 4:
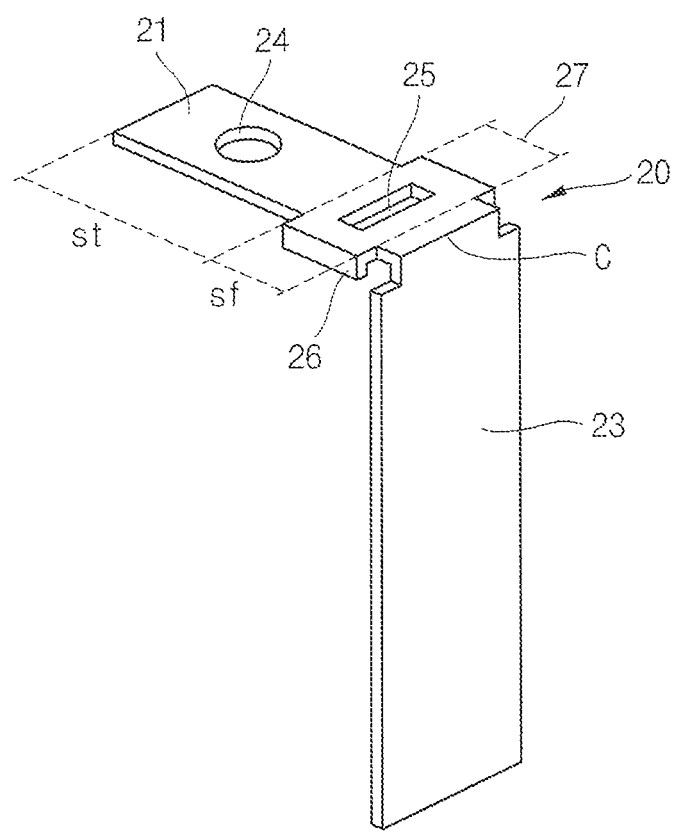
FIG. 4 is a perspective view of a first collector plate of the rechargeable battery shown in FIG. 2.

FIG. 1 is a perspective view of a rechargeable battery according to an embodiment of the present invention; FIG. 2 is a cross-sectional view of the rechargeable battery of FIG. 1, taken along the line I-I'; FIG. 3 is an enlarged cross-sectional view illustrating a region "A" of FIG. 2; and FIG. 4 is a perspective view of a first collector plate of the rechargeable battery shown in FIG. 2.

Referring to FIGS. 1 and 2, a rechargeable battery 100 according to an embodiment of the present invention includes an electrode assembly 10, a first collector plate 20, a second collector plate 30, a case 40, and a cap assembly 50.

The electrode assembly 10 is formed by winding or laminating a stacked structure having a first electrode plate 11, a separator 13, and a second electrode plate 12, which are formed of a thin plate or layer. Here, the first electrode plate 11 may function as a positive electrode, and the second electrode plate 12 may function as a negative electrode, or vice versa.

The first electrode plate 11, in one embodiment, may be formed by applying a first electrode active material, such as a transition metal oxide, on a first electrode collector formed of metal foil, such as aluminum foil. The first electrode plate 11 may include a first electrode uncoated portion 11a on which the first electrode active material is not applied. The first electrode uncoated portion 11a may function as a path for current flowing between the first electrode plate 11 and the outside of the first electrode plate 11. However, in other embodiments of the present invention, the material of the first electrode plate 11 is not limited to those listed herein.

The second electrode plate 12, in one embodiment, may be formed by applying a second electrode active material, such as graphite or carbon, on a second electrode collector formed of metal foil, such as nickel or copper foil. The second electrode plate 12 may include a second electrode uncoated portion 12a on which the second electrode active material is not applied. The second electrode uncoated portion 12a may function as a path for current flowing between the second electrode plate 12 and the outside of the second electrode plate 12. However, in other embodiments of the present invention, the material of the second electrode plate 12 is not limited to those listed herein.

In other embodiments, polarities of the first and second electrode plates 11 and 12 may differ from what is described above. That is, the first electrode plate 11 may function as a negative electrode, and the second electrode plate 12 may function as a positive electrode.

The separator 13 may be disposed between the first electrode plate 11 and the second electrode plate 12 to prevent or substantially prevent electrical short circuits and allow the movement of lithium ions. The separator 13 may be formed of, for example, polyethylene, polypropylene, or a combined film of polypropylene and polyethylene. However, in other embodiments of the present invention, the material of the separator 13 is not limited to those listed herein.

The first collector plate 20 and the second collector plate 30 to be electrically connected to the first electrode plate 11 and the second electrode plate 12, respectively, are coupled to both ends of the electrode assembly 10.

The first collector plate 20 may be formed of a conductive metal, such as aluminum, and may contact the first electrode uncoated portion 11a protruding at one end of the electrode assembly 10 to be electrically connected to the first electrode plate 11.

Referring to FIGS. 2 to 4, the first collector plate 20 may include a first coupling part 21, a first extension part 23, a first terminal hole 24, a fuse hole 25, and a fuse protrusion 26.

The first coupling part 21 is installed between a top portion of the electrode assembly 10 and a bottom portion of the cap assembly 50 and is shaped as a plate. As shown in FIG. 4, the first coupling part 21 may be divided into a first terminal region St where the first terminal hole 24 is formed, and a fuse region Sf where the fuse hole 25 is formed.

The first extension part 23 is bent and extended from an end of the first coupling part 21 and is shaped as a plate substantially contacting the first electrode uncoated portion 11a. A corner at which the first coupling part 21 and the first extension part 23 meet is denoted by "C," and, in one embodiment, the first coupling part 21 and the first extension part 23 may be perpendicular to each other about the corner C.

The first terminal hole 24 is formed at one side of the first coupling part 21, that is, at the first terminal region St, and provides a space of the first coupling part 21 to which a first electrode terminal 52 of the cap assembly 50 is inserted and coupled. In one embodiment, the first terminal region St is positioned in the first coupling part 21 to be distal from the corner C.

The fuse hole 25 and the fuse protrusion 26, in one embodiment, are positioned above the electrode assembly 10, that is, at the fuse region Sf of the first coupling part 21 so as not to make contact with an electrolyte, for the purpose of preventing or substantially preventing the electrolyte from igniting due to heat generated in the fuse region Sf where the fuse hole 25 and the fuse protrusion 26 are formed. In one embodiment, the fuse region Sf is positioned at a region of the first coupling part 21, near the corner C, such that the fuse hole 25 and the fuse protrusion 26 do not overlap with the first electrode terminal 52 coupled to the first terminal hole 24.

In one embodiment, the fuse hole 25 may have a form of a groove having a smaller thickness than other parts of the first coupling part 21, rather than that of a hole passing through the first coupling part 21, as configured in another embodiment. When a short circuit is caused in the rechargeable battery 100, a high current flows through the rechargeable battery 100, such that heat is generated to make the region having the fuse hole 25 melt to break the current flow. That is, the fuse hole 25 may serve as a fuse.

If excessive heat is generated due to overcharging of the rechargeable battery 100 or an internal pressure of the rechargeable battery 100 exceeds a certain pressure (e.g., a preset pressure) due to decomposition of electrolyte, an inversion plate 60 and a second terminal plate 56 make contact with each other to cause a short circuit. Accordingly, the region where the fuse hole 25 is formed is melted due to the short circuit to break the current flow, thereby causing the rechargeable battery 100 to stop being charged or discharged before a dangerous situation, such as fire or explosion, occurs.

In one embodiment, the fuse protrusion 26 is bent and extended from a side of the fuse region Sf toward the electrode assembly 10 to be angled or tilted with respect to a surface of the fuse region Sf. At least one fuse protrusion 26 may be formed at opposite sides (e.g., the left and right) of the fuse hole 25. The fuse protrusion 26, in one embodiment, is bent around the fuse hole 25 and reinforces the strength of the region where the fuse hole 25 is formed. Accordingly, the fuse protrusion 26 may prevent or substantially prevent the region where the fuse hole 25 is formed from being bent or damaged, such as due to external impacts, when a short circuit is not caused in the rechargeable battery 100 because of poor resistance to external impacts in the region where the fuse hole 25 is formed. In the following description, the fuse region Sf where the fuse hole 25 and the fuse protrusion 26 are formed will be referred to as a second fuse part 27.

The second collector plate 30 may be formed of a conductive material, such as nickel or copper and may contact the second electrode uncoated portion 12a protruding at the other end of the electrode assembly 10 to be electrically connected to the second electrode plate 12. The second collector plate 30 may include a second coupling part 31, a second extension part 33, and a second terminal hole 34.

In the second collector plate 30, a fuse hole and a fuse protrusion, corresponding to the fuse hole 25 and the fuse protrusion 26 of the first collector plate 20 described above and shown in FIG. 4, may not be provided. That is, in one embodiment of the present invention, the first collector plate 20 includes the fuse hole 25 functioning as a fuse, and the first collector plate 20 made of, for example, aluminum, has a lower melting point than the second collector plate 30 made of, for example, copper, thereby more easily achieving a fuse function. However, in another embodiment of the present invention, a fuse hole (not shown) and a fuse protrusion (not shown) may be formed only in the second collector plate 30, while the fuse hole 25 and the fuse protrusion 26 are not formed in the first collector plate 20.

The case 40 may be formed of a conductive metal, such as aluminum, an aluminum alloy, or a nickel-plated steel and may have a generally hexahedron shape provided with an opening through which the electrode assembly 10, the first collector plate 20, and the second collector plate 30 are inserted and placed. Since the case 40 and the cap assembly 50 are illustrated in an assembled state in FIG. 2, the opening of the case 40 is not shown. However, it is to be understood that the opening corresponds to a substantially open portion of the edge of the cap assembly 50. The inner surface of the case 40 may be treated to be insulated from the electrode assembly 10, the first and second collector plates 20 and 30, and the cap assembly 50. In one embodiment, the case 40 has a polarity. For example, the case 40 may function as a positive electrode.

The cap assembly 50 is coupled to the case 40. In one embodiment, the cap assembly 50 may include a cap plate 51, a first electrode terminal 52, a second electrode terminal 53, a gasket 54, a first terminal plate 55, and the second terminal plate 56. In one embodiment, the cap assembly 50 may further include a plug 57, a vent plate 58, an upper insulation member 59a, a connection plate 59b, the inversion plate 60, and a lower insulation member 61.

The cap plate 51 closes the opening of the case 40. The cap plate 51, in one embodiment, may be formed of the same material as that of the case 40. The cap plate 51 may have the same polarity as that of the case 40.

The first electrode terminal 52, passing through the cap plate 51, is electrically connected to the first collector plate 20. The first electrode terminal 52 may be shaped as a pillar. In one embodiment, an upper pillar exposed to an upper portion of the cap plate 51 is coupled to the first terminal plate 55 by riveting, and has a protrusion 52b to prevent or substantially prevent the first electrode terminal 52 from being dislodged from the cap plate 51. A flange 52a may be formed in a lower pillar positioned at a lower portion of the cap plate 51 to prevent or substantially prevent the first electrode terminal 52 from being dislodged from the cap plate 51. A portion of the pillar of the first electrode terminal 52 positioned at a lower portion of the flange 52a is fitted into the first terminal hole 24 of the first collector plate 20. In one embodiment, the first electrode terminal 52 may be electrically connected to the cap plate 51.

The second electrode terminal 53, passing through the cap plate 51, is electrically connected to the second collector plate 30. The second electrode terminal 53, in one embodiment, has a same configuration as the first electrode terminal 52, and, therefore, repeated description will be omitted. In one embodiment, the second electrode terminal 53 is insulated from the cap plate 51.

The gasket 54 may be formed of an insulating material and may be disposed between each of the first electrode terminal 52 and the second electrode terminal 53 and the cap plate 51 to seal a space between each of the first electrode terminal 52 and the second electrode terminal 53 and the cap plate 51. The gasket 54 may prevent or substantially prevent the introduction of moisture into the rechargeable battery 100 or the leakage of the electrolyte from the rechargeable battery 100.

The first terminal plate 55, in one embodiment, is coupled to the upper pillar of the first electrode terminal 52 by riveting to fix the first electrode terminal 52 to the cap plate 51. The first terminal plate 55 includes a first terminal body part 55a coupled to the first electrode terminal 52, and a first fuse part 55b formed at a position of the first terminal body part 55a to be spaced apart from the first electrode terminal 52. The first fuse part 55b is formed at a side portion of the first terminal body part 55a connected to an external terminal. The first fuse part 55b is formed to have a greater electrical resistance and, in one embodiment, a smaller thickness than the first terminal body part 55a. The first fuse part 55b may have a thickness according to a capacity of a fuse required when a short circuit is caused in the rechargeable battery 100. In one embodiment, the first fuse part 55b may have a groove or hole to have a greater electrical resistance than the first terminal body part 55a. In one embodiment, the first fuse part 55b may be formed to have a greater electrical resistance than the second fuse part 27 formed in the first collector plate 20. That is, the first fuse part 55b may be formed to have a relatively small thickness so as to have a greater electrical resistance than the second fuse part 27 or to have a smaller fuse capacity than the second fuse part 27 by forming a relatively large hole or groove.

When a short circuit is caused in the rechargeable battery 100, a high current flows through the rechargeable battery 100, such that heat is generated to cause the first fuse part 55b to melt to break the current flow. That is, the first fuse part 55b may serve as a fuse. Here, when heat is generated in the rechargeable battery 100 due to high-voltage disconnection occurring in a state in which the rechargeable battery 100 is connected to an external rechargeable battery or overcharge in the rechargeable battery 100, or when the electrolyte is decomposed to cause the internal pressure of the rechargeable battery 100 to exceed a certain pressure (e.g., a preset pressure), the short circuit may be caused by the inversion plate 60 and the second terminal plate 56 contacting each other. Accordingly, the first fuse part 55b is melted faster than the second fuse part 27 formed in the rechargeable battery 100, that is, inside the cell, to cause arcing to occur outside the cell, thereby preventing or substantially preventing a risk of abnormal explosion due to arcing generated when the second fuse part 27 in the cell is melted.

The second terminal plate 56, in one embodiment, is coupled to the upper pillar of the second electrode terminal 53 by riveting to fix the second electrode terminal 53 to the cap plate 51. The second terminal plate 56 is formed to allow the second electrode terminal 53 to be fitted thereto at an exterior part spaced apart from the cap plate 51, that is, above the upper insulation member 59a, and extends to cover a short-circuit hole 51c of the cap plate 51. The second terminal plate 56 is electrically connected to the second electrode terminal 53. When heat is generated in the rechargeable battery 100 due to high-voltage disconnection occurring in a state in which the rechargeable battery 100 is connected to an external rechargeable battery or overcharge in the rechargeable battery 100, or when the electrolyte is decomposed to make the internal pressure of the rechargeable battery 100 exceed a certain pressure (e.g., a preset pressure), the short circuit may be caused by the pressure forcing the inversion plate 60 to be upwardly convexly inverted and contact the second terminal plate 56. Here, the first fuse part 55b or the second fuse part 27 may perform a fuse function, thereby improving the safety of the rechargeable battery 100.

The plug 57 may close an electrolyte injection hole 51a of the cap plate 51. The vent plate 58 is installed in a vent hole 51b of the cap plate 51 and, in one embodiment, has a notch 58a configured to be opened at a certain pressure (e.g., a preset pressure).

The upper insulation member 59a is formed to be inserted between the second electrode terminal 53 and the cap plate 51 and makes close contact with the cap plate 51 and the gasket 54. The upper insulation member 59a insulates the second electrode terminal 53 from the cap plate 51.

The connection plate 59b is formed to be inserted between the first electrode terminal 52 and the cap plate 51 and makes close contact with the cap plate 51 and the gasket 54. The connection plate 59b electrically connects the first electrode terminal 52 to the cap plate 51.

The inversion plate 60 is disposed between the upper insulation member 59a and the cap plate 51 in the short-circuit hole 51c of the cap plate 51. The inversion plate 60 includes a downwardly convex round part, and a flange part fixed to the cap plate 51. The inversion plate 60 may be inverted to upwardly convexly protrude when heat is generated in the rechargeable battery 100 due to high-voltage disconnection occurring in a state in which the rechargeable battery 100 is connected to an external rechargeable battery or overcharge in the rechargeable battery 100, or when the electrolyte is decomposed to cause the internal pressure of the rechargeable battery 100 to exceed a certain pressure (e.g., a preset pressure). The inversion plate 60 has the same polarity as that of the cap plate 51.

The lower insulation member 61 is formed between each of the first collector plate 20 and the second collector plate 30 and the cap plate 51, thereby preventing or substantially preventing unnecessary short circuits.

As described above, the rechargeable battery 100 according to an embodiment of the present invention includes the first terminal plate 55 having the first fuse part 55b and the first collector plate 20 having the second fuse part 27, thereby allowing the first fuse part 55b provided in the first terminal plate 55 outside the case 40 to operate earlier than the second fuse part 27 provided in the first collector plate 20 inside the case 40, thereby causing internally generated arcing to be generated outside the cell when a short circuit occurs.

Therefore, the rechargeable battery 100 according to an embodiment of the present invention may have improved safety by preventing or substantially preventing abnormal breakdown generated inside the cell when a short circuit occurs.

A rechargeable battery according to another embodiment of the present invention is described below.

Figure 5:
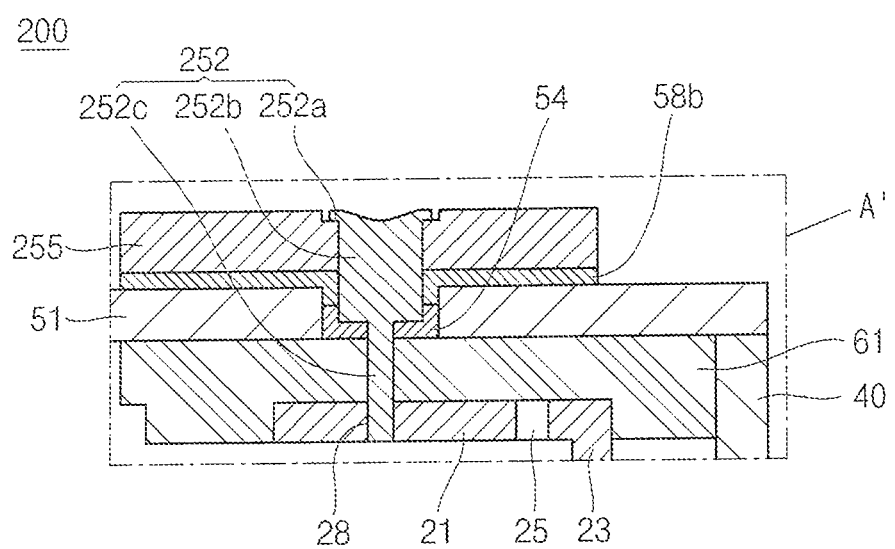
FIG. 5 is an enlarged cross-sectional view illustrating a region A' in a rechargeable battery according to another embodiment of the present invention, corresponding to the region "A" of FIG. 2.

FIG. 5 is an enlarged cross-sectional view illustrating a region A' in a rechargeable battery 200 according to another embodiment of the present invention, corresponding to the region "A" of FIG. 2.

The rechargeable battery 200 according to another embodiment of the present invention is substantially the same as the rechargeable battery 100 described above and shown in FIG. 2, in view of configuration and functions, except for a position of a first fuse part 252c. That is, unlike the first fuse part 55b of the rechargeable battery 100 that is formed in the first terminal plate 55, the first fuse part 252c of the rechargeable battery 200 is formed in a first electrode terminal 252. In the rechargeable battery 200 according to an embodiment of the present invention, further description of the same functional elements as those of the rechargeable battery 100 described above will be omitted, and the following description will focus on the first fuse part 252c formed in the first electrode terminal 252.

Referring to FIG. 5, the first electrode terminal 252 includes the first fuse part 252c functioning as a fuse. In one embodiment, the first electrode terminal 252 includes a terminal body part 252b and the first fuse part 252c. The terminal body part 252b protrudes to the outside of the cap plate 51 to be coupled to a first terminal plate 255. The terminal body part 252b, in one embodiment, is coupled to the first terminal plate 255 by riveting, but the present invention is not limited thereto. The terminal body part 252b, in one embodiment, has protrusions 252a formed at opposite sides of a top portion of the electrode terminal 252 to prevent or substantially prevent the first electrode terminal 252 from being dislodged from the cap plate 51 when the first electrode terminal 252 is coupled to the first terminal plate 255 by riveting. The first fuse part 252c extends to the inside of the case 40 from one end (i.e. a bottom end) of the terminal body part 252b. The first fuse part 252c may be formed to have a greater electrical resistance and, in one embodiment, a smaller thickness than the terminal body part 252b. The first fuse part 252c may have a thickness according to a capacity of a fuse required when a short circuit is caused in the rechargeable battery 200.

In one embodiment, the first fuse part 252c may be formed to have a greater electrical resistance than the second fuse part 27 formed in the first collector plate 20. That is, the first fuse part 252c may be formed to have a relatively small thickness so as to have a greater electrical resistance than the second fuse part 27 or to have a smaller fuse capacity than the second fuse part 27 by forming a relatively large hole or groove.

When a short circuit is caused in the rechargeable battery 200, a high current flows through the rechargeable battery 200, such that heat is generated to cause the first fuse part 252c to melt to break, the current flow. That is, the first fuse part 252c may serve as a fuse. Here, when heat is generated in the rechargeable battery 200 due to high-voltage disconnection occurring in a state in which the rechargeable battery 200 is connected to an external rechargeable battery or overcharge in the rechargeable battery 200, or when the electrolyte is decomposed to cause an internal pressure of the rechargeable battery 200 to exceed a certain pressure (e.g., a preset pressure), the short circuit may be caused by the inversion plate 60 and the second terminal plate 56 contacting each other. Accordingly, in one embodiment, the first fuse part 252c is melted faster than the second fuse part 27 formed in the rechargeable battery 200, that is, inside the cell, to cause arcing to occur outside the cell, thereby preventing or substantially preventing a risk of abnormal explosion due to arcing generated when the second fuse part 27 in the cell is melted.

Figure 6:
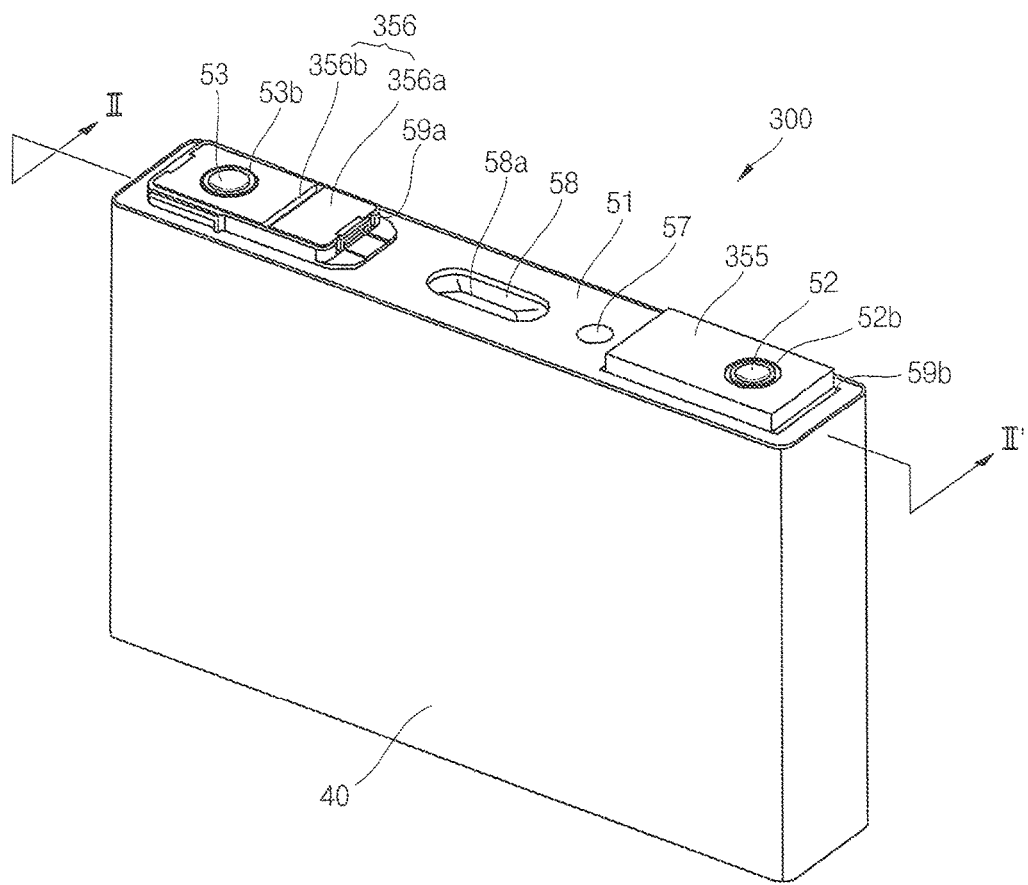
FIG. 6 is a perspective view of a rechargeable battery according to another embodiment of the present invention.
Figure 7:
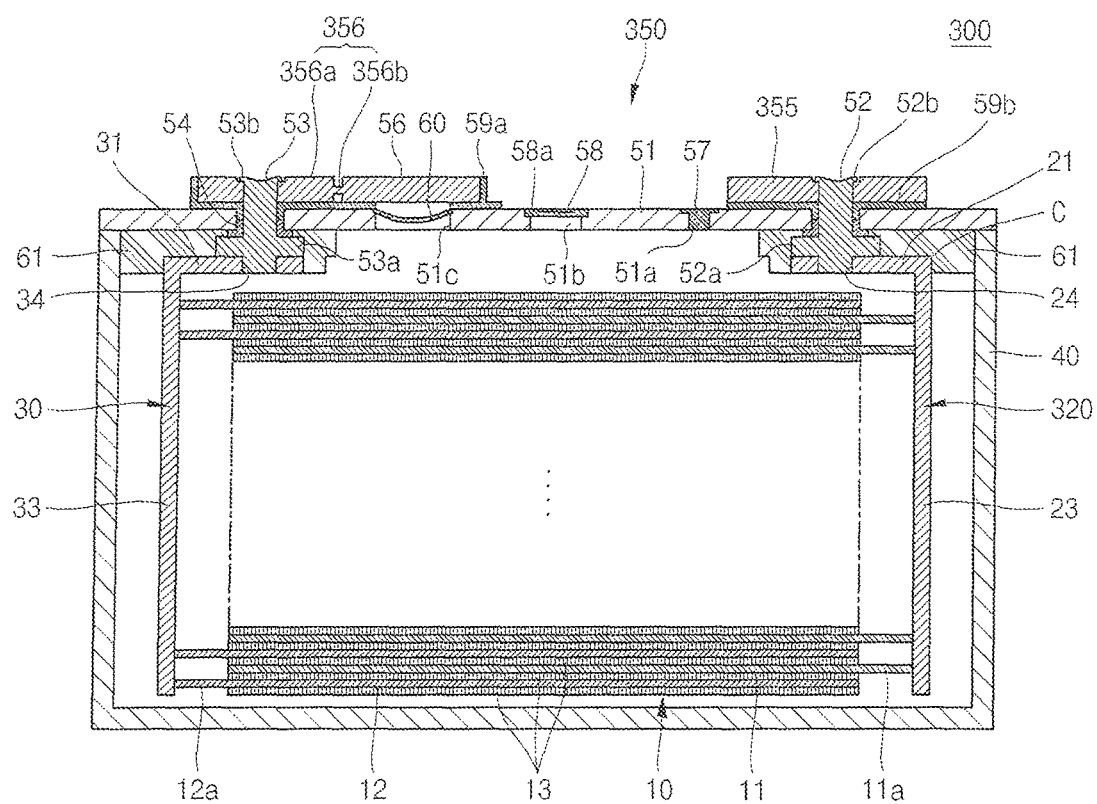
FIG. 7 is a cross-sectional view of the rechargeable battery of FIG. 6, taken along the line II-II'.

FIG. 6 is a perspective view of a rechargeable battery 300 according to another embodiment of the present invention; and FIG. 7 is a cross-sectional view of the rechargeable battery 300, taken along the line II-II'.

The rechargeable battery 300 according to another embodiment of the present invention is substantially the same as the rechargeable battery 100 described above and shown in FIG. 2, in view of configuration and functions, except that unlike in the rechargeable battery 100 in which the first fuse part 55b is formed in the first terminal plate 55, a first fuse part 356b of the rechargeable battery 300 is formed in a second terminal plate 356, and a second fuse part is not formed in a first collector plate 320 or in a first terminal plate 355. In the rechargeable battery 300 according to an embodiment of the present invention, further description of the same functional elements as those of the rechargeable battery 100 described above will be omitted, and the following description will focus on the first fuse part 356b formed in the second terminal plate 356.

Referring to FIGS. 6 and 7, the rechargeable battery 300 according to an embodiment of the present invention includes the electrode assembly 10, the first collector plate 320, the second collector plate 30, the case 40 and a cap assembly 350.

The cap assembly 350 includes the first terminal plate 355 and the second terminal plate 356 coupled to the first electrode terminal 52 and the second electrode terminal 53 protruding to the outside of the case 40, respectively.

The second terminal plate 356, in one embodiment, is coupled to an upper pillar of the second electrode terminal 53 by riveting to fix the second electrode terminal 53 to the cap plate 51. The second terminal plate 356 includes a second terminal body part 356a coupled to the second electrode terminal 53 and the first fuse part 356b formed at a position of the second terminal body part 356a to be spaced apart from the first electrode terminal 53. The first fuse part 356b is formed at a side portion of the second terminal body part 356a connected to an external terminal. The first fuse part 356b is formed to have a greater electrical resistance and, in one embodiment, a smaller thickness than the second terminal body part 356a. The first fuse part 356b may have a thickness according to a capacity of a fuse required when a short circuit is caused in the rechargeable battery 300. In one embodiment, the first fuse part 356b may include a groove or a hole formed to have a greater electrical resistance than the second terminal body part 356a. In one embodiment, the first fuse part 356b may be made of a different material from the second terminal body part 356a to have a greater electrical resistance than the second terminal body part 356a. In one embodiment, for example, the first fuse part 356b may be made of a clad metal having a greater electrical resistance than a material, such as copper, forming the second terminal body part 356a.

When a short circuit is caused in the rechargeable battery 300, a high current flows through the rechargeable battery 300, such that heat is generated to cause the first fuse part 356b to melt to break the current flow. That is, the first fuse part 356b may serve as a fuse. Here, if excessive heat is generated due to overcharge of the rechargeable battery 300 or the internal pressure of the rechargeable battery 300 exceeds a certain pressure (e.g., a preset pressure), such as due to decomposition of electrolyte, the inversion plate 60 and the second terminal plate 356 make contact with each other to cause a short circuit. Accordingly, the first fuse part 356b is melted using the short circuit to cause arcing to occur outside the rechargeable battery 300, that is, outside a cell, thereby improving the safety of the cell.

While some exemplary embodiments have been disclosed herein, and although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims and equivalents thereof.

What is claimed is:

1. A rechargeable battery comprising:
an electrode assembly including a first electrode plate, a second electrode plate, and a separator between the first electrode plate and the second electrode plate;
a case accommodating the electrode assembly;
a first electrode terminal and a second electrode terminal electrically connected to the first electrode plate and the second electrode plate, respectively, and protruding outside the case;
a first collector plate at a side of the electrode assembly and electrically connecting the first electrode plate to the first electrode terminal; and
a first terminal plate and a second terminal plate positioned outside the case and coupled to the first electrode terminal and the second electrode terminal, respectively,
wherein the first terminal plate comprises a first fuse part positioned outside the case and configured to melt and break a flow of current therethrough when the first electrode terminal and the second electrode terminal are short circuited, the first terminal plate being electrically connected to the case when the first electrode terminal and the second electrode terminal are not short circuited, and
wherein the first collector plate comprises a second fuse part positioned inside the case, the first fuse part having a smaller fuse capacity than the second fuse part such that the first fuse part is configured to melt and break a flow of current therethrough before the second fuse part is melted and a flow of current therethrough is broken when the first electrode terminal and the second electrode terminal are short circuited.

2. The rechargeable battery as claimed in claim 1, wherein the first terminal plate comprises:
a first terminal body part coupled to the first electrode terminal; and
the first fuse part at a region of the first terminal body part.

3. The rechargeable battery as claimed in claim 2, wherein the first fuse part has a greater electrical resistance than the first terminal body part.

4. The rechargeable battery as claimed in claim 2, wherein the first fuse part has a smaller thickness than the first terminal body part.

5. The rechargeable battery as claimed in claim 2, wherein the first fuse part comprises a different material from the first terminal body part and has a greater electrical resistance than the first terminal body part.

6. The rechargeable battery as claimed in claim 2, wherein the first fuse part comprises a clad metal.

7. The rechargeable battery as claimed in claim 1, further comprising a second collector plate at a side of the electrode assembly opposite the first collector plate, and electrically connecting the second electrode plate to the second electrode terminal.

8. The rechargeable battery as claimed in claim 1, wherein the first collector plate comprises:
a coupling part coupled to the first electrode terminal; and
an extension part extending from the coupling part and coupled to the first electrode plate.

9. The rechargeable battery as claimed in claim 8, wherein the second fuse part is formed in the coupling part and spaced apart from the first electrode terminal.

10. The rechargeable battery as claimed in claim 1, wherein the first fuse part has a greater electrical resistance than the second fuse part.

11. The rechargeable battery as claimed in claim 1, further comprising a cap assembly sealing the case and comprising a cap plate having a short-circuit hole covered by the second terminal plate, wherein the cap assembly includes an inversion plate in the short-circuit hole.

12. The rechargeable battery as claimed in claim 11, wherein the inversion plate includes:
a convex round part; and
a flange part fixed to the cap plate.

13. The rechargeable battery as claimed in claim 11, wherein the inversion plate is inverted and contacts the second terminal plate when an internal pressure of the rechargeable battery exceeds a reference pressure.

14. The rechargeable battery as claimed in claim 11, wherein the inversion plate is electrically connected to the first electrode plate.

15. The rechargeable battery as claimed in claim 11, wherein the second terminal plate includes:
a second terminal body part coupled to the second electrode terminal.

* * * * *